US011110749B2

(12) United States Patent
Celik et al.

(10) Patent No.: US 11,110,749 B2
(45) Date of Patent: Sep. 7, 2021

(54) WHEEL FOR A SUPPORT STRUCTURE

(71) Applicant: The Goodyear Tire & Rubber Company, Akron, OH (US)

(72) Inventors: Ceyhan Celik, Stow, OH (US); Steven Amos Edwards, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 515 days.

(21) Appl. No.: 16/043,418

(22) Filed: Jul. 24, 2018

(65) Prior Publication Data
US 2020/0031166 A1    Jan. 30, 2020

(51) Int. Cl.
*B60C 7/06*     (2006.01)
*B60C 7/14*     (2006.01)
*B29D 30/02*    (2006.01)

(52) U.S. Cl.
CPC ............... *B60C 7/06* (2013.01); *B60C 7/14* (2013.01); *B29D 30/02* (2013.01); *B60C 2007/146* (2013.01)

(58) Field of Classification Search
CPC .......... B60B 9/26; B60B 23/10; B60B 25/02; B60B 7/18; B60B 7/06; B60B 7/063; B60B 7/0614; B60B 7/061; B60C 7/143; B60C 7/08; B60C 7/18; B60C 2007/107; B60C 7/06; B60C 7/14; B60C 2007/146
See application file for complete search history.

(56) References Cited

U.S. PATENT DOCUMENTS

| 479,255   | A    | 7/1892  | Dunlop              |
|-----------|------|---------|---------------------|
| 482,175   | A    | 9/1892  | Hollafolla          |
| 1,002,003 | A    | 8/1911  | Simonson            |
| 1,233,722 | A    | 7/1917  | Smith               |
| 1,389,285 | A    | 8/1921  | Althoff             |
| 1,451,517 | A    | 4/1923  | Smith               |
| 1,930,764 | A    | 10/1933 | Mallory             |
| 2,378,154 | A *  | 6/1945  | Nelson ...... B60B 9/26 |
|           |      |         | 301/58              |
| 3,493,027 | A    | 2/1970  | Dewhirst            |
| 4,223,952 | A *  | 9/1980  | Weld ...... B60B 25/22 |
|           |      |         | 29/894.322          |
| 4,226,273 | A    | 10/1980 | Long et al.         |
| 4,235,270 | A    | 11/1980 | Kahaner et al.      |
| 4,602,823 | A    | 7/1986  | Berg                |
| 5,343,916 | A    | 9/1994  | Duddey et al.       |
| 5,800,643 | A    | 9/1998  | Frankowski          |
| 6,068,721 | A    | 5/2000  | Dyer et al.         |
| 6,260,598 | B1   | 7/2001  | Tanaka              |
| 6,286,572 | B1   | 9/2001  | Chen                |
| 6,464,302 | B1 * | 10/2002 | Huang ...... B60B 1/06 |
|           |      |         | 301/5.1             |

(Continued)

FOREIGN PATENT DOCUMENTS

WO    2017117598    7/2017

*Primary Examiner* — Scott A Browne
(74) *Attorney, Agent, or Firm* — Robert N. Lipcsik

(57) ABSTRACT

A wheel assembly includes a plurality of discreet, axially extending curved friction plates for engaging a first side of a spoke structure of a tire assembly, a first annular rim piece for engaging a rotatable axle, and a second annular rim piece for engaging the first rim piece. The first rim piece and the second rim piece each have axially extending lugs for engaging opposite ends of the friction plates.

10 Claims, 12 Drawing Sheets

(56) References Cited

U.S. PATENT DOCUMENTS

| | | | |
|---|---|---|---|
| 8,151,846 B2* | 4/2012 | Lipper | B60B 3/08 |
| | | | 152/399 |
| 8,962,120 B2 | 2/2015 | Delfino et al. | |
| 10,603,956 B2* | 3/2020 | Celik | B60C 7/26 |
| 2004/0069385 A1 | 4/2004 | Timoney et al. | |
| 2010/0193097 A1 | 8/2010 | McNier et al. | |
| 2012/0205017 A1* | 8/2012 | Endicott | B60B 1/042 |
| | | | 152/1 |
| 2014/0083581 A1 | 3/2014 | Schaedler et al. | |
| 2016/0214435 A1 | 7/2016 | Schaedler et al. | |
| 2018/0134072 A1 | 5/2018 | Celik et al. | |
| 2019/0152256 A1* | 5/2019 | Hwang | B60B 23/10 |
| 2020/0047555 A1* | 2/2020 | Costlow | B60C 7/20 |

* cited by examiner

WHEEL FOR A SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires is limited. It is an object of the present invention to overcome this limitation and increase the load carrying capacity and durability of these spokes and hence the performance of the top loader non-pneumatic tire.

SUMMARY OF THE INVENTION

A wheel assembly in accordance with the present invention includes a plurality of discreet, axially extending curved friction plates for engaging a first side of a spoke structure of a tire assembly, a first annular rim piece for engaging a rotatable axle, and a second annular rim piece for engaging the first rim piece. The first rim piece and the second rim piece each have axially extending lugs for engaging opposite ends of the friction plates.

According to another aspect of the wheel assembly, each lug of the second rim piece has an axial blind threaded bore for receiving a threaded bolt to secure the tire assembly, the first rim piece, the second rim piece, and the friction plates together.

According to still another aspect of the wheel assembly, the friction plates each have cylindrical, convex surfaces corresponding to a shape of the spoke structure of the tire assembly.

According to yet another aspect of the wheel assembly, the lugs of the first rim piece define a semi-cylindrical extension for receiving ends of the friction plates.

According to still another aspect of the wheel assembly, the first rim piece includes an axially extending curved skirt for engaging a second side of the spoke structure of the tire assembly, the second side of the spoke structure being radially opposite the first side of the spoke structure of the tire.

According to yet another aspect of the wheel assembly, the second rim piece includes an axially extending curved skirt for engaging a second side of the spoke structure of the tire, the second side of the spoke structure being radially opposite the first side of the spoke structure of the tire.

According to still another aspect of the wheel assembly, parts of the spoke structure are secured in a sandwich configuration with parts of the first rim piece, parts of the second rim piece, and the friction plates.

According to yet another aspect of the wheel assembly, axially outer ends of the skirts of both the first rim piece and the second rim piece axially extend toward each other when the wheel assembly and tire assembly are secured by fasteners, such as bolts.

According to still another aspect of the wheel assembly, the first rim piece is constructed as a single integral component with a spoke structure of the first rim piece.

According to yet another aspect of the wheel assembly, the second rim piece is constructed as a single integral component with the lugs of the second rim piece.

A method in accordance with the present invention secures a wheel assembly and a tire together. The method includes the steps of: laying a first rim piece on a horizontal surface; lowering the tire on to the first rim piece; lowering a plurality of discreet friction plates on to lugs of the first rim piece; lowering a second rim piece on to the friction plates through the spoke structure of the tire; inserting axially extending lugs of the second rim piece into corresponding semi-cylindrical cavities of the friction plates; and securing the first and second rim pieces both circumferentially and axially to each other while simultaneously securing the tire to the first and second rim pieces.

According to another aspect of the method, a further step includes sandwiching parts of the tire between the friction plates and skirts of both the first rim piece and the second rim piece.

According to still another aspect of the method, a further step includes approximating curvatures of surfaces of the friction plates with curvatures of parts of the spoke structure of the tire.

According to yet another aspect of the method, a further step includes interlocking the tire with the first rim piece, the second rim piece, and the friction plates.

According to still another aspect of the method, a further step includes securing the first rim piece, the second rim piece, the friction plates, and the tire together for installation on an axle of a vehicle.

According to yet another aspect of the method, a further step includes constructing the first rim piece and the second rim piece of metal.

According to still another aspect of the method, a further step includes sandwiching curved parts of the tire between convex friction plates of the first rim piece and concave saddle plates of the first rim piece.

According to yet another aspect of the method, a further step includes inserting threaded bolts through the first rim piece into blind openings of the second rim piece.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

Figure 1:
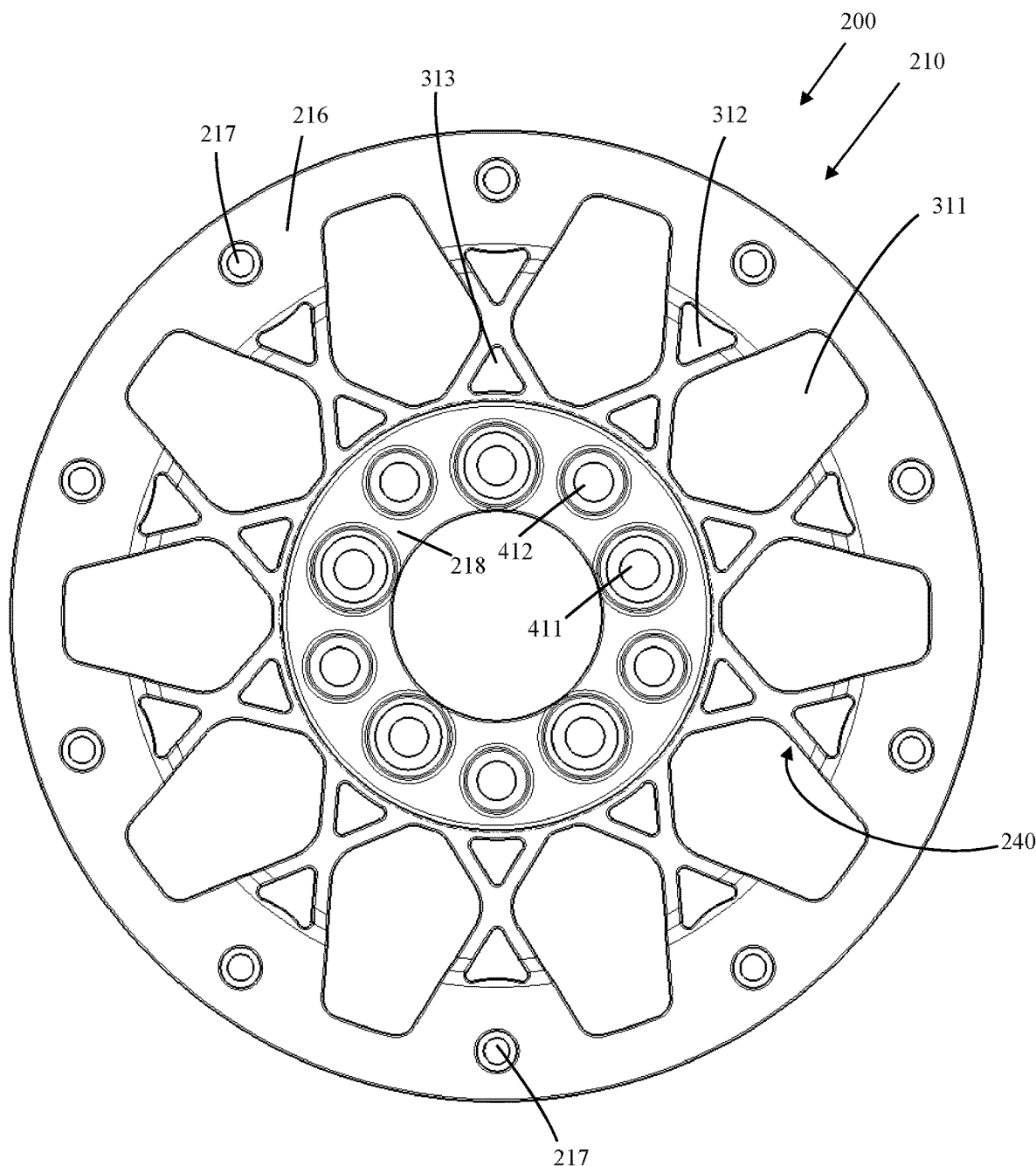
FIG. 1 is a schematic side axial view of a first part of an example wheel assembly in accordance with the present invention.
Figure 2:
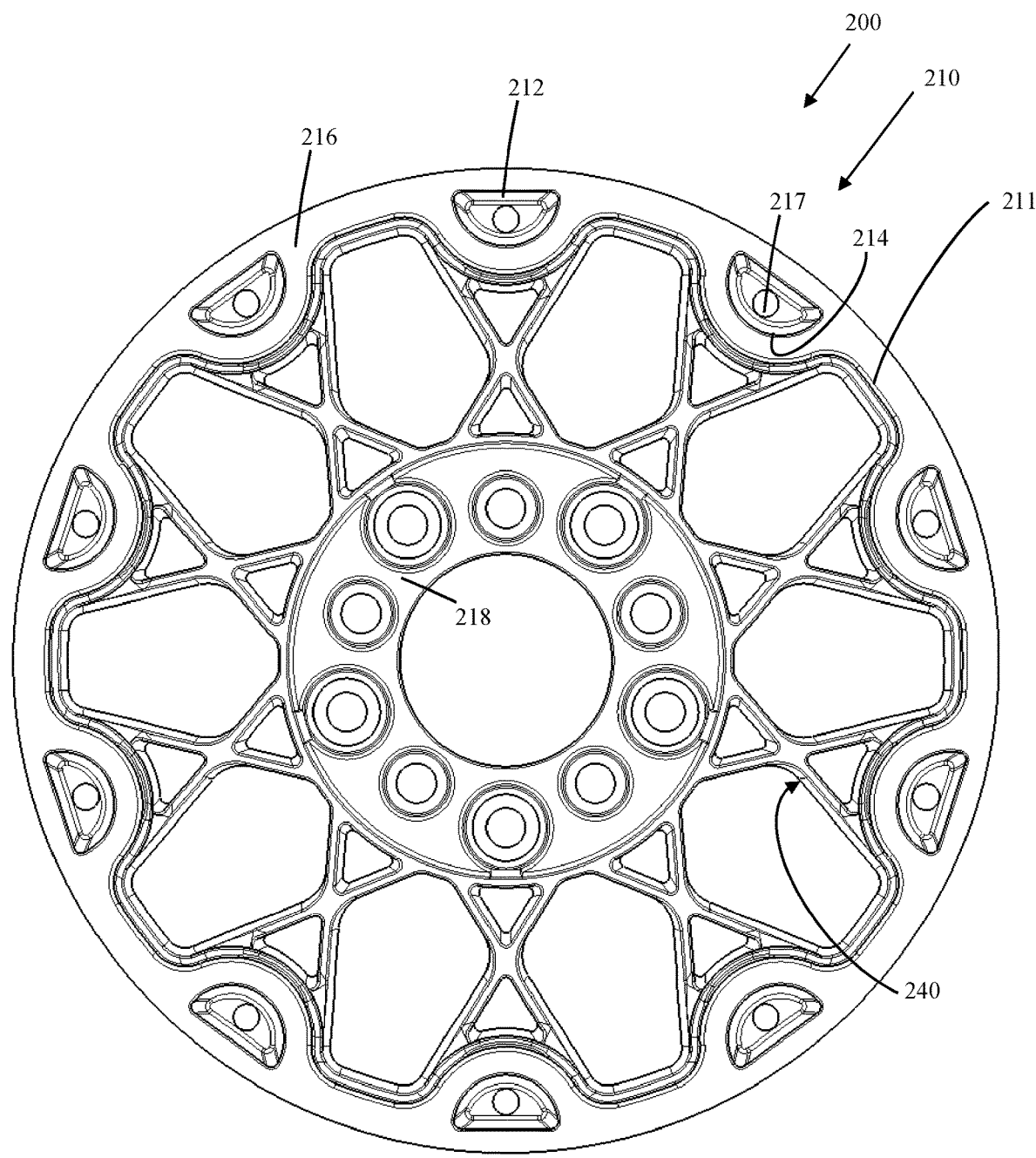
FIG. 2 is a schematic reverse side axial view of the first part of the wheel assembly of FIG. 1.
Figure 3:
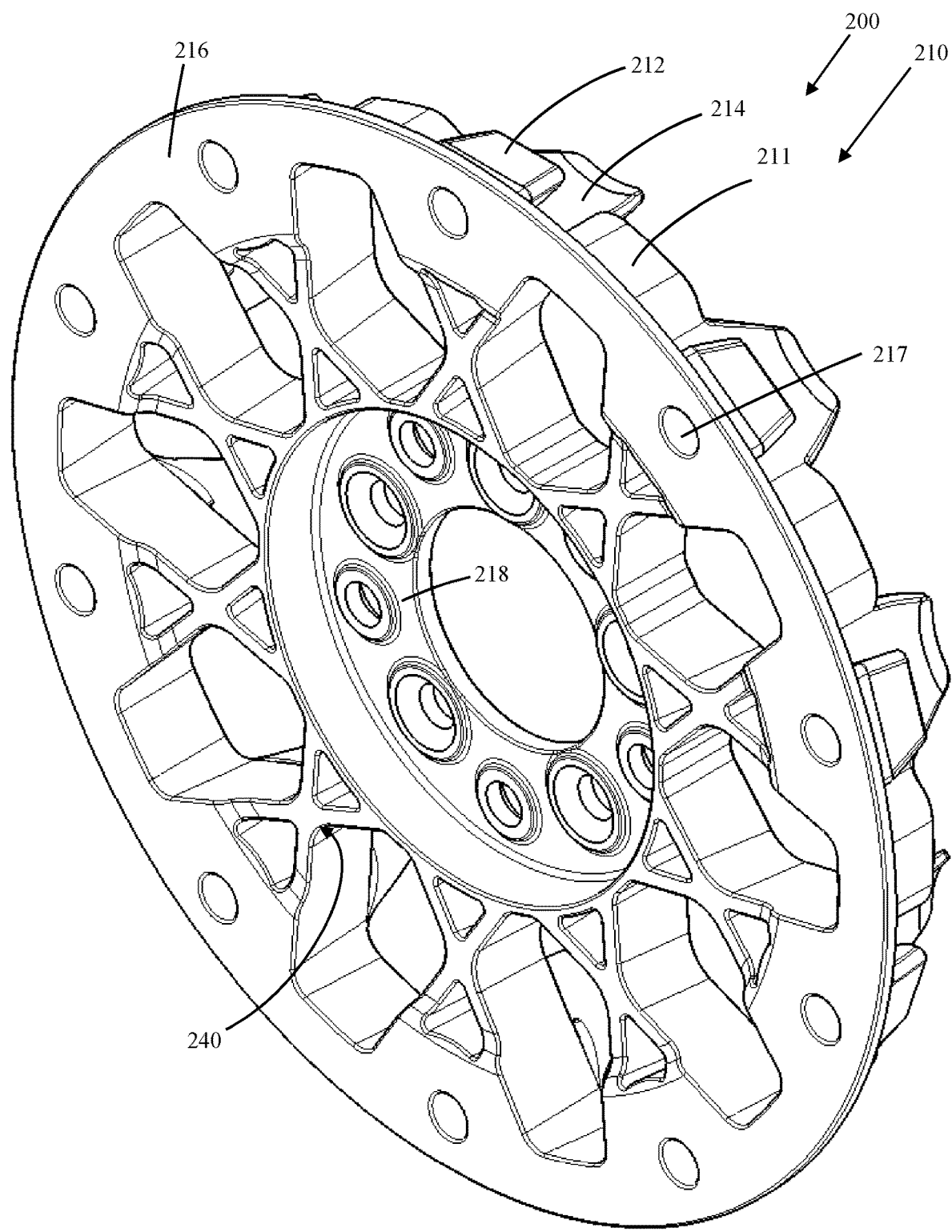
FIG. 3 is a schematic perspective view of the first part of the wheel assembly of FIG. 1.

A conventional wheel/tire assembly may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional wheel/tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

As shown in FIGS. 9-12, an example tire assembly 140, such as that described in Applicant's U.S. patent application Ser. No. 15/938,486, filed Mar. 28, 2018, incorporated herein by reference in its entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may have an inner central rim, such as an automobile wheel (not shown), and a circular outer flexible ring, which may include a shear band and tread structure, mounted on the inner central rim by a continuous cord/fabric reinforced spoke structure 110 extending between the inner central rim and the outer ring.

The spoke structure 110 may define a plurality of cavities disposed concentrically about the inner central rim allowing the spoke structure to deflect under load thereby defining a suitable balance between flexibility for ride comfort and traction within a footprint of the assembly 140 and stiffness for vehicle handling, low rolling resistance, and low heat build-up within the spoke structure. The cavities of the spoke structure 110 may further define openings for arms of the inner central rim to extend therethrough and secure the spoke structure to the inner central rim. The arms may engage portions in a mechanical interlocking arrangement. The inner central rim may further include plates that, along with the arms may sandwich the portions of the spoke structure 110 and create a further frictional and/or adhesive securement between the inner central rim and the spoke structure. The spoke structure 110 may comprise a homogenous or heterogeneous polymer and/or a filled polymer.

Spokes of the spoke structure 110 may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The spokes may be oriented at angle between 0 degrees and 90 degrees. The reinforcement of the spokes may be continuously reinforced across their entire axial length. Continuous reinforcement layer(s) may extend radially outward to multiple locations adjacent to a shear band at the outer flexible ring.

Each cavity may have a common cross-sectional profile about the axis of rotation of the assembly. Further, each cavity may have a common axial length equal to a uniform axial thickness of the spoke structure 110. Each cavity may be curvedly shaped to prevent "pinch" points on the reinforcement layer(s) and mitigate compressive stress concentrations on the reinforcement layer(s). The number of cavities may be between 2 and 60 for large scale tire assemblies 140. The inner central rim may include steel, cast iron, aluminum, aluminum alloys, magnesium allows, and/or iron alloys.

FIGS. 1-12 show a wheel assembly 200 in accordance with the present invention for use with pneumatic and/or non-pneumatic tire assemblies, such as the tire assembly 140. The wheel assembly 200 may include a first annular rim piece 210 and a second annular rim piece 220, both for engaging a rotatable axle or similar structure (not shown).

Figure 4:
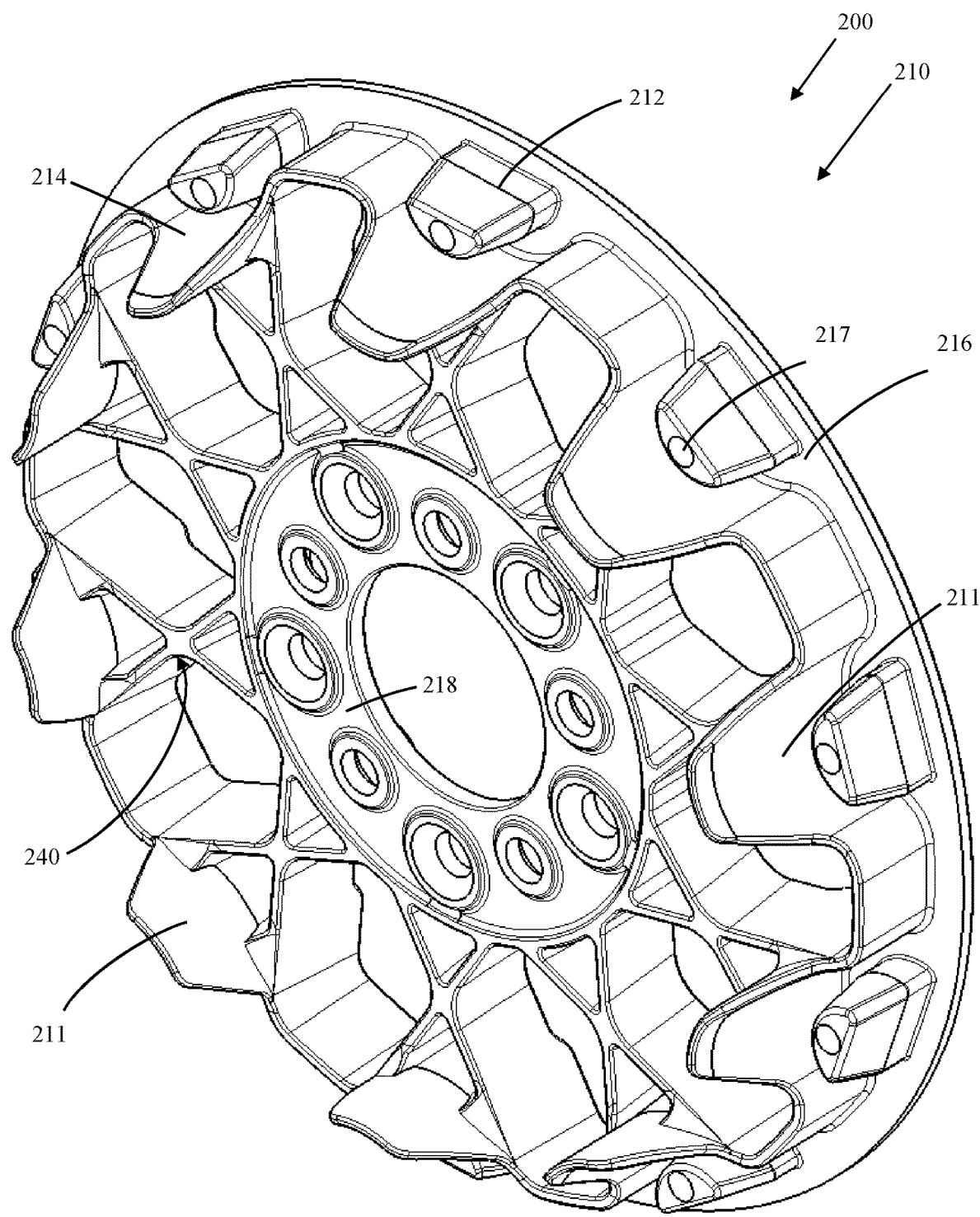
FIG. 4 is another schematic perspective view of the first part of the wheel assembly of FIG. 1.
Figure 5:
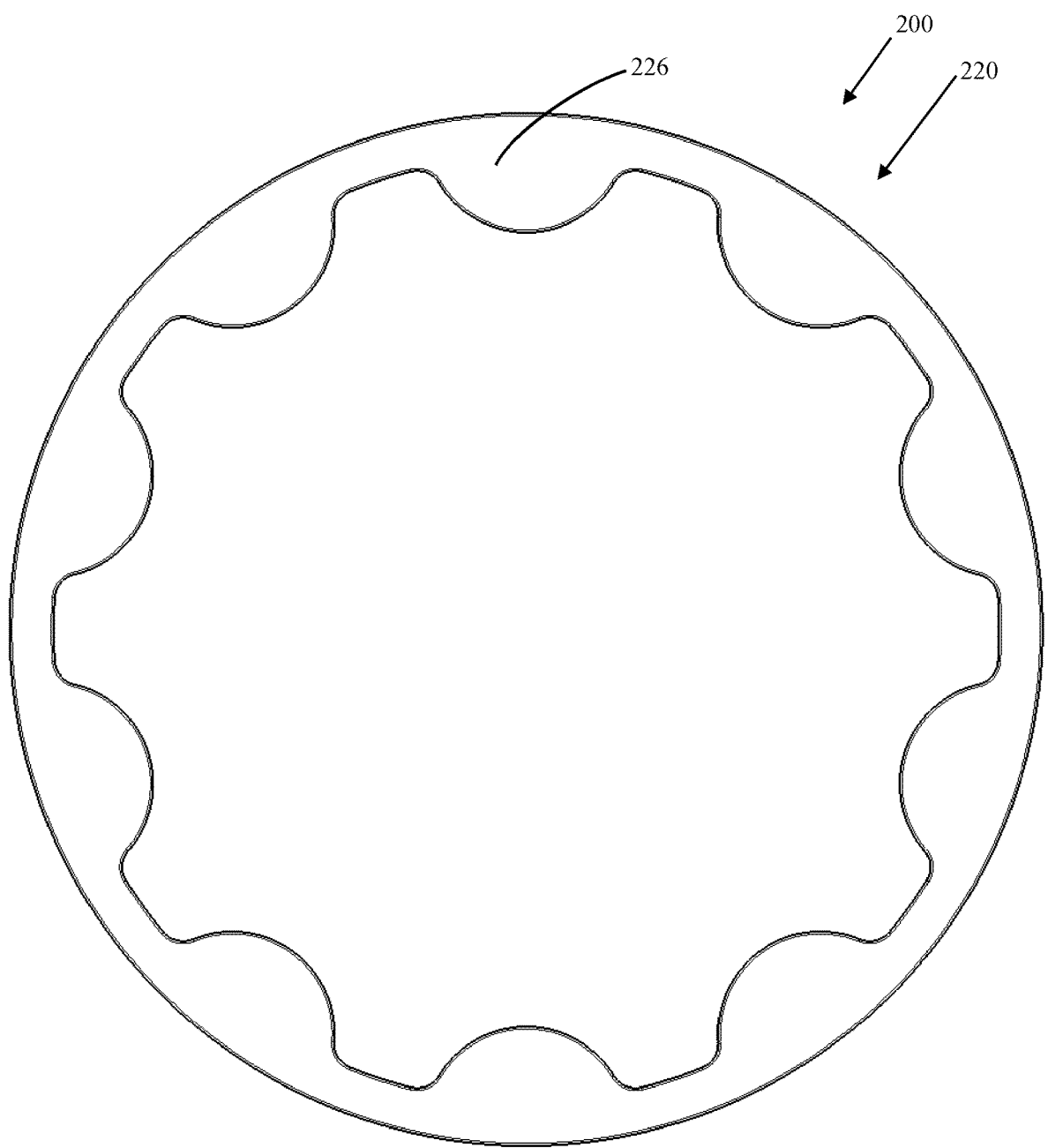
FIG. 5 is a schematic side axial view of a second part of the example wheel assembly in accordance with the present invention.
Figure 6:
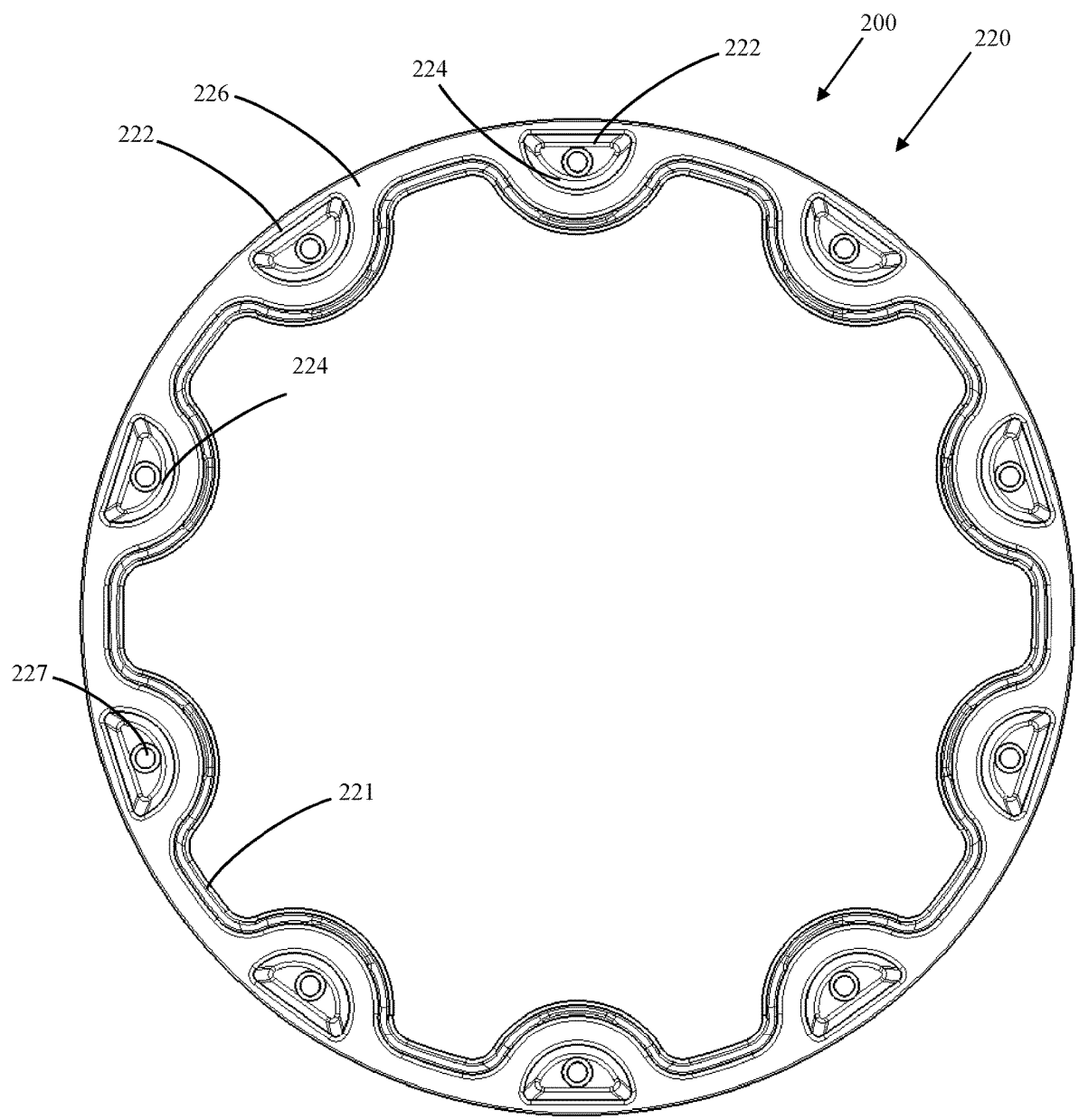
FIG. 6 is a schematic reverse side axial view of the second part of the wheel assembly of FIG. 5.
Figure 7:
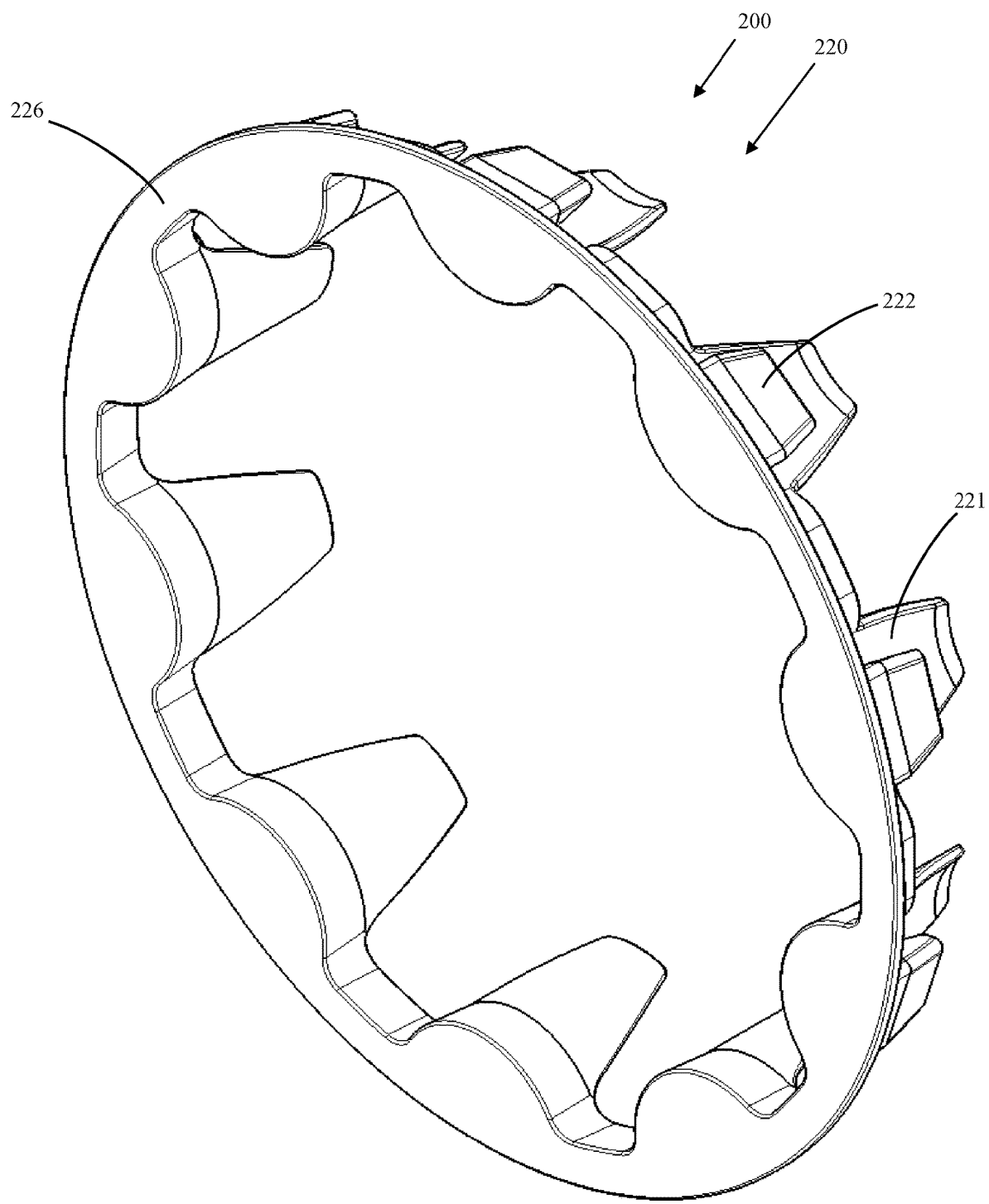
FIG. 7 is a schematic perspective view of the second part of the wheel assembly of FIG. 5.

The first rim piece 210 may have first axially extending linear attachment lugs 212 (10 shown) and corresponding second axially extending curved attachment lugs 214 (10 shown) for engaging a first axial end 231 of axially extending, individual, partially cylindrical friction plates 230 (10 shown). The first lugs 212 and second lugs 214 may extend from a first annular main body 216 of the first rim piece 210 toward the second rim piece 220. The first and second lugs 212, 214 may form a single solid lug (FIG. 4). A skirt 211 may extend axially from the first main body 216 toward the second rim piece 220. The skirt 211 may extend circumferentially entirely around the first main body 216. The first main body 216 may have circumferentially spaced openings 217 (10 shown) extending axially through, and circumferentially aligned with, the single piece lugs 212, 214 for receiving fasteners 219.

An integral spoke structure 240 may extend radially from the first annular main body 216 to a second annular inner rim body 218. The spoke structure 240 may be defined several groups of openings for reducing the weight of the spoke structure. A first group may include a plurality of pentagonal openings 311 (10 shown) arranged concentrically around the spoke structure 240. A second group may include a plurality of triangular openings 312 (10 shown) arranged concentrically around the spoke structure 240 at a first radius. A third group may include a plurality of mirror image triangular openings 313 (10 shown) arranged concentrically around the spoke structure 240 at a second radius less than the first radius.

The second inner rim body 218 may include several groups of openings for attaching the wheel assemble 200 to a hub (not shown). A first group may include a plurality of circular openings 411 (5 shown) arranged concentrically around the spoke structure 240. A second group may include a plurality of circular openings 412 (5 shown) arranged concentrically around the spoke structure 240. The openings 411, 412 may be arranged at equal distances or radii from the axis of rotation of the wheel assembly 200 (not shown) or at differing distances from the axis of rotation of the wheel assembly (FIGS. 1-4 & 9-10).

Figure 8:
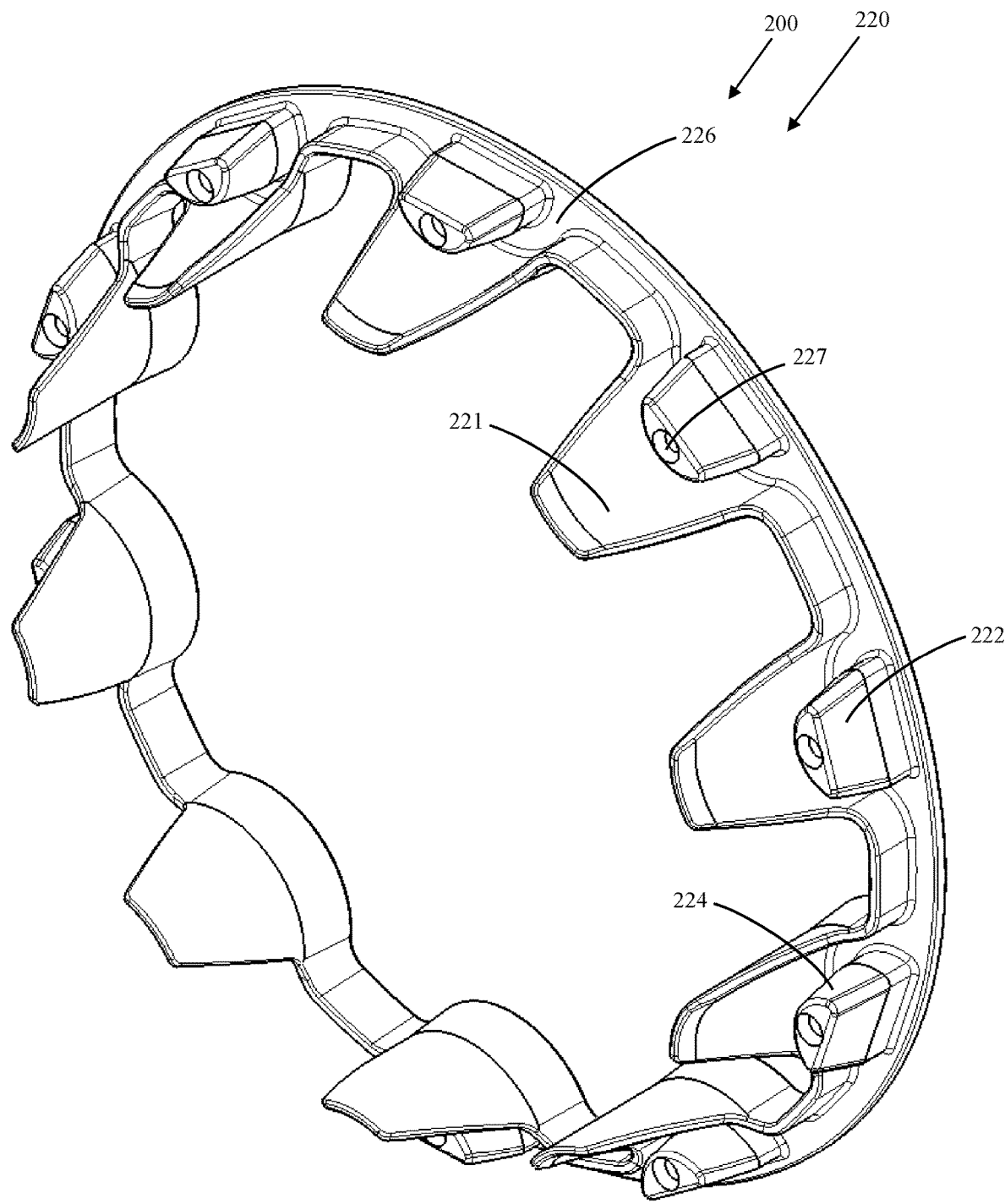
FIG. 8 is another schematic perspective view of the second part of the wheel assembly of FIG. 5.

The second rim piece 220 may have first axially extending linear attachment lugs 222 (10 shown) and corresponding second axially extending curved attachment lugs 224 (10 shown) for engaging a second axial end 232 of the axially extending, individual, partially cylindrical friction plates 230 (10 shown). The first and second lugs 222, 224 may form a single solid lug (FIG. 8). A skirt 221 may extend axially from an annular main body 226 of the second rim piece 220 toward the first rim piece 210. The skirt 221 may extend circumferentially entirely around the main body 226. The single piece lugs 222, 224 may have circumferentially spaced blind openings 227 (10 shown) extending axially through, and aligned with, the single piece lugs 222, 224 for receiving the fasteners 219. The blind openings 227 may or may not be threaded for receiving the fasteners 219.

Figure 9:
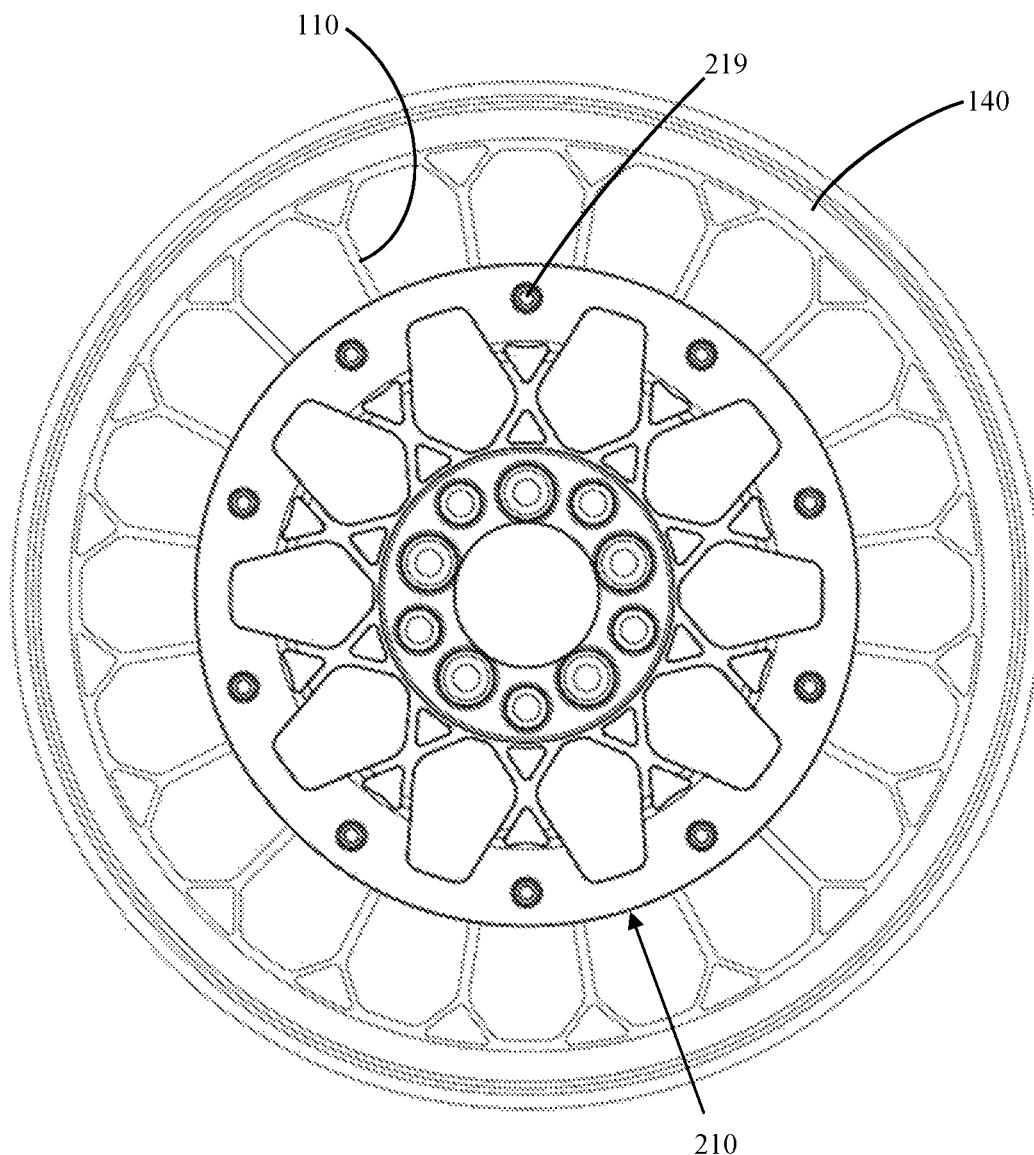
FIG. 9 is a schematic side axial view of the entire wheel assembly of FIGS. 1 & 5 attached to an example tire.
Figure 10:
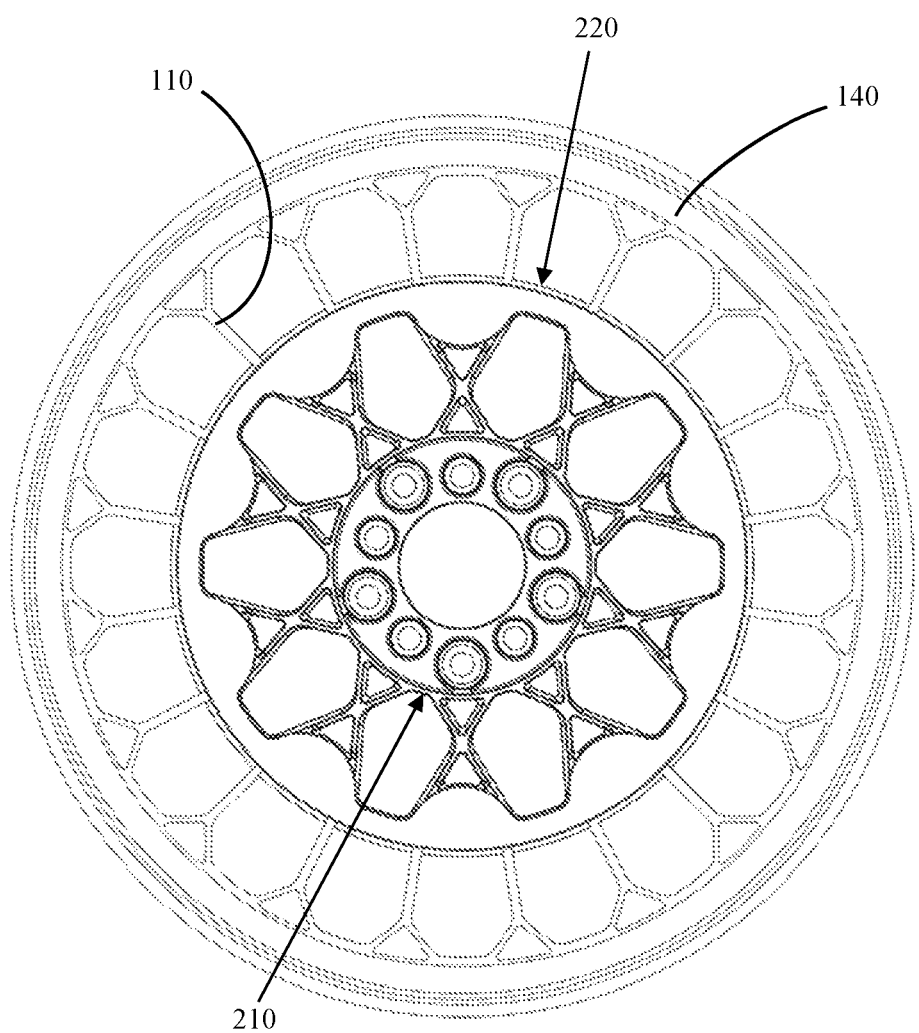
FIG. 10 is a schematic reverse side axial view of the wheel assembly and example tire of FIG. 9.
Figure 11:
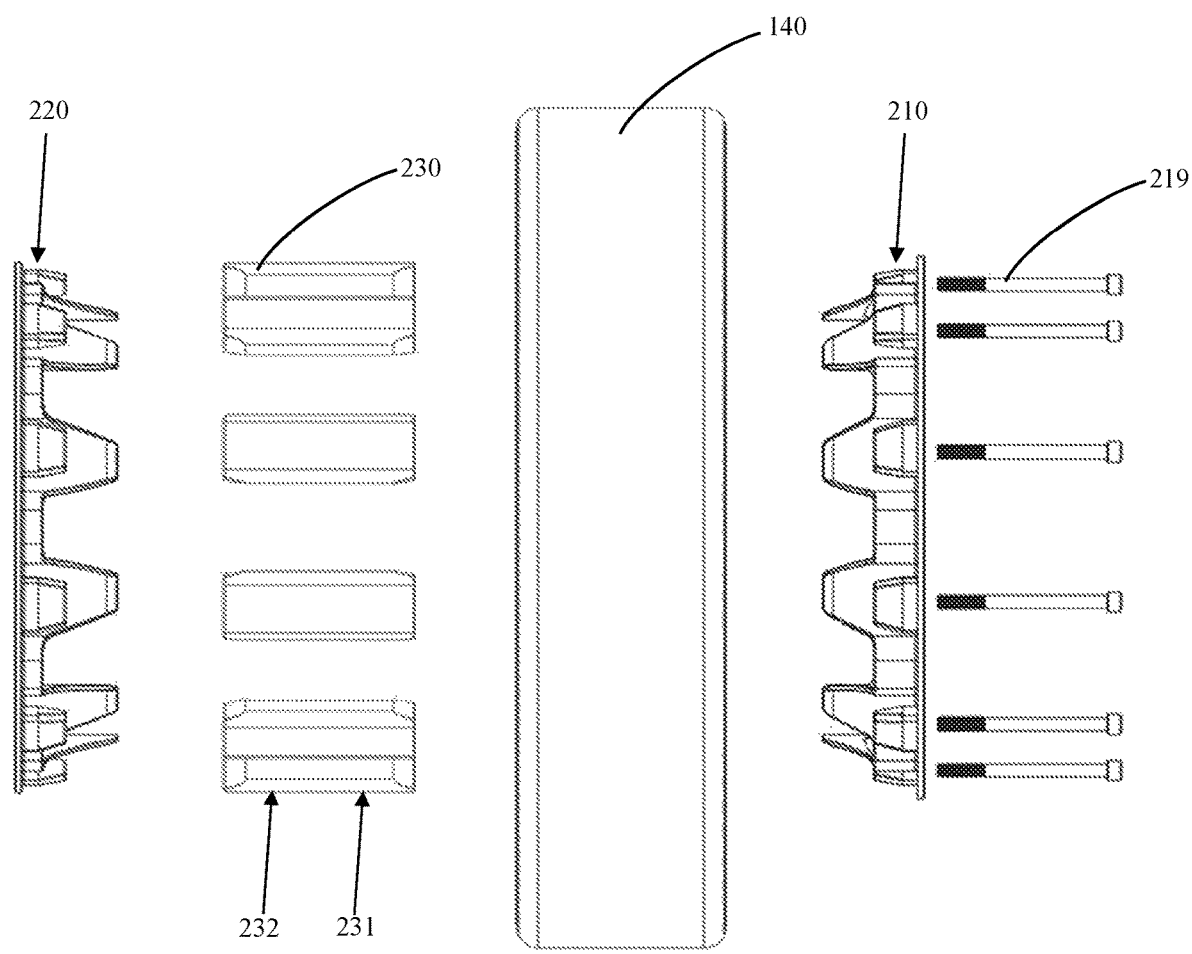
FIG. 11 is a schematic exploded side lateral view of the wheel assembly of FIGS. 1 & 5 and the example tire.
Figure 12:
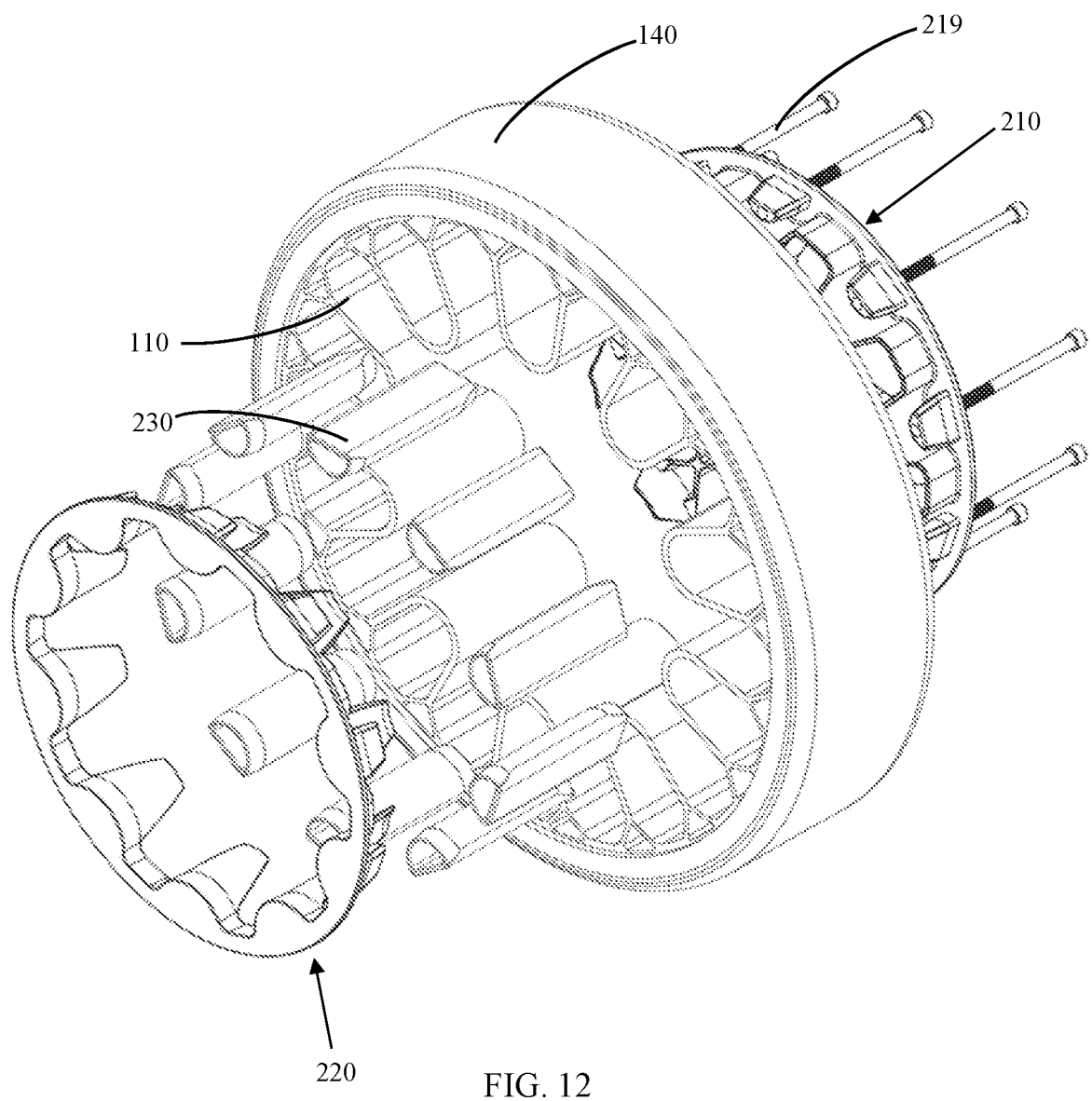
FIG. 12 is a schematic exploded perspective view of the entire wheel assembly of FIGS. 1 & 5 and the example tire.

FIGS. 1-12 represent an example method for securing the wheel assembly 200 and the tire assembly 140 together for installation on a vehicle. FIGS. 1-4 show the first rim piece 210 by itself. FIGS. 5-8 show the second rim piece 220 by itself. FIGS. 9-10 show the wheel assembly 200 and tire assembly 140 secured to each other and ready for mounting on a vehicle. In this configuration, the hollow outer ends 231, 232 of the friction plates 230 may axially engage the solid lugs 212, 214 of the first rim piece 210 and the solid lugs 222, 224 of the second rim piece 220 such that both rim pieces are aligned radially for rotation upon installation on a vehicle. FIGS. 11-12 show an exploded view of the parts of the wheel assembly 200 and the example tire assembly 140.

A method in accordance with the present invention may secure the wheel assembly 200 and the tire 140 together. The method may include the steps of: laying a first rim piece 210 on a horizontal surface; lowering the tire 140 on to the first rim piece 210; lowering a plurality of discreet friction plates 230 on to lugs 212, 214 of the first rim piece 210; lowering a second rim piece 220 on to the friction plates 230 through the spoke structure 110 of the tire 140; inserting axially extending lugs 222, 224 of the second rim piece 220 into corresponding semi-cylindrical cavities of the friction plates 230; and securing the first and second rim pieces 210, 220 both circumferentially and axially to each other while simultaneously securing the tire 140 to the first and second rim pieces 210, 220.

A further step of the method may include sandwiching parts 110 of the tire 140 between the friction plates 230 and skirts 211, 221 of both the first rim piece 210 and the second rim piece 220. A further step of the method may include approximating curvatures of surfaces of the friction plates 230 with curvatures of parts of the spoke structure 110 of the tire 140. A further step of the method may include interlocking the tire 140 with the first rim piece 210, the second rim piece 220, and the friction plates 230. A further step of the method may include securing the first rim piece 210, the second rim piece 220, the friction plates 230, and the tire 140 together for installation on an axle of a vehicle.

A further step of the method may include constructing the first rim piece 210 and the second rim piece 220 of metal. A further step of the method may include sandwiching curved parts 110 of the tire 140 between convex friction plates 230 concave parts of the skirts 211, 221. A further step of the method may include inserting threaded bolts 219 through the first rim piece 210 into blind openings 227 of the second rim piece 220.

Variations in the present invention are possible in light of the description of it provided herein. While certain representative examples and details have been shown for the purpose of illustrating the present invention, it will be apparent to those skilled in this art that various changes and/or modifications may be made therein without departing from the scope of the present invention. It is, therefore, to be understood that changes may be made in the particular examples described herein, which will be within the full scope of the present invention as defined by the following appended claims. Further, the present invention is not limited to the examples hereinbefore described, which may be varied in construction and/or detail within the full scope of the appended claims.

What is claimed:

1. A wheel assembly comprising:
   a plurality of discreet, axially extending curved friction plates for engaging a first side of a spoke structure of a tire;
   a first annular rim piece for engaging a rotatable axle; and
   a second annular rim piece for engaging the first rim piece, the first rim piece and the second rim piece each having axially extending lugs for engaging opposite ends of the friction plates, each lug of the second rim piece having an axial blind threaded bore for receiving a threaded bolt to secure the tire, the first rim piece, the second rim piece, and the friction plates together.

2. The wheel assembly as set forth in claim 1 wherein the friction plates each have cylindrical, convex surface corresponding to a shape of the spoke structure of the tire.

3. The wheel assembly as set forth in claim 1 wherein the lugs of the first rim piece define a semi-cylindrical extension for receiving ends of the friction plates.

4. The wheel assembly as set forth in claim 1 wherein the first rim piece includes axially extending curved skirt for engaging a second side of the spoke structure of the tire assembly, the second side of the spoke structure being radially opposite the first side of the spoke structure of the tire.

5. The wheel assembly as set forth in claim 1 wherein the second rim piece includes axially extending curved skirt for engaging a second side of the spoke structure of the tire, the second side of the spoke structure being radially opposite the first side of the spoke structure of the tire.

6. The wheel assembly as set forth in claim 1 wherein parts of the spoke structure are secured in a sandwich configuration with parts of the first rim piece, parts of the second rim piece, and the friction plates.

7. The wheel assembly as set forth in claim 1 wherein axially outer ends of skirts of both the first rim piece and the second rim piece axially extend toward each other when the wheel assembly and tire assembly are secured by bolts.

8. The wheel assembly as set forth in claim 1 wherein the first rim piece is constructed as a single integral component with a spoke structure of the first rim piece.

9. The wheel assembly as set forth in claim 1 wherein the second rim piece is constructed as a single integral component with the lugs of the second rim piece.

10. A wheel assembly comprising:
- a plurality of discreet, axially extending curved friction plates for engaging a first side of a spoke structure of a tire;
- a first annular rim piece for engaging a rotatable axle; and
- a second annular rim piece for engaging the first rim piece, the first rim piece and the second rim piece each having axially extending lugs for engaging opposite ends of the friction plates, the first rim piece including an axially extending curved skirt for engaging a second side of the spoke structure of the tire assembly, the second side of the spoke structure being radially opposite the first side of the spoke structure of the tire.

\* \* \* \* \*